US011639869B2

(12) United States Patent
Kanbayashi et al.

(10) Patent No.: US 11,639,869 B2
(45) Date of Patent: May 2, 2023

(54) ROAD SURFACE CONDITION IDENTIFICATION APPARATUS

(71) Applicant: DENSO CORPORATION, Kariya (JP)

(72) Inventors: Ryosuke Kanbayashi, Kariya (JP); Masashi Mori, Kariya (JP); Takatoshi Sekizawa, Kariya (JP); Yoichiro Suzuki, Nisshin (JP)

(73) Assignee: DENSO CORPORATION, Kariya (JP)

( * ) Notice: Subject to any disclaimer, the term of this patent is extended or adjusted under 35 U.S.C. 154(b) by 393 days.

(21) Appl. No.: 16/880,089

(22) Filed: May 21, 2020

(65) Prior Publication Data

US 2020/0284648 A1     Sep. 10, 2020

Related U.S. Application Data

(63) Continuation of application No. PCT/JP2018/043170, filed on Nov. 22, 2018.

(30) Foreign Application Priority Data

Nov. 23, 2017 (JP) .............................. JP2017-225268

(51) Int. Cl.
*G01P 3/50* (2006.01)
*G01P 15/00* (2006.01)
(Continued)

(52) U.S. Cl.
CPC ............. *G01H 11/06* (2013.01); *B60K 35/00* (2013.01); *G01P 3/50* (2013.01); *G01P 15/00* (2013.01);
(Continued)

(58) Field of Classification Search
None
See application file for complete search history.

(56) References Cited

U.S. PATENT DOCUMENTS

2008/0087035 A1*  4/2008  Kim ..................... B60H 1/3233
                                                                    62/285
2009/0105921 A1*  4/2009  Hanatsuka ......... B60G 17/0165
                                                                    701/80

(Continued)

FOREIGN PATENT DOCUMENTS

JP          2005186830 A        7/2005
JP          2011025914 A        2/2011
(Continued)

*Primary Examiner* — Muhammad Adnan
(74) *Attorney, Agent, or Firm* — Harness, Dickey & Pierce, P.L.C.

(57) ABSTRACT

A road surface condition identification apparatus for identifying a road surface condition is provided. The road surface condition identification apparatus includes a vibration detector unit configured to output a detection signal being an analog signal according to magnitude of vibration of the tire. For identifying the road surface condition, the road surface condition identification apparatus performs A-D conversion of converting the detection signal of the vibration detector unit into a digital signal. Based on data on vehicle speed, the road surface to condition identification apparatus sets a conversion range of the magnitude of the vibration of the tire used in the AD conversion from the detection signal into the digital signal.

8 Claims, 8 Drawing Sheets

(51) Int. Cl.
 *B60W 40/06* (2012.01)
 *G01H 11/06* (2006.01)
 *B60K 35/00* (2006.01)

(52) U.S. Cl.
 CPC ...... *B60K 2370/1529* (2019.05); *B60W 40/06* (2013.01)

(56) References Cited

U.S. PATENT DOCUMENTS

| | | |
|---|---|---|
| 2010/0332096 A1 | 12/2010 | Hanzawa et al. |
| 2011/0077835 A1* | 3/2011 | Otsuka ................. B60W 10/10 701/99 |
| 2013/0116972 A1* | 5/2013 | Hanatsuka ............. G01B 17/08 702/167 |
| 2015/0280616 A1* | 10/2015 | Naito ..................... G01H 11/06 73/658 |
| 2016/0368501 A1* | 12/2016 | Suzuki ................ B60W 40/068 |
| 2016/0368502 A1* | 12/2016 | Suzuki ................. B60W 40/06 |
| 2017/0309093 A1* | 10/2017 | Feng ..................... B60W 10/10 |
| 2018/0012091 A1* | 1/2018 | Ricci .................. G06Q 30/0601 |
| 2018/0264894 A1* | 9/2018 | Goto ..................... B60W 40/06 |
| 2018/0364197 A1 | 12/2018 | Suzuki et al. |
| 2019/0092338 A1* | 3/2019 | Tsukasaki ............. B60W 50/14 |
| 2020/0231162 A1* | 7/2020 | Mori ..................... B60W 40/06 |
| 2020/0240777 A1* | 7/2020 | Ishii ........................ G01W 1/00 |
| 2020/0317203 A1* | 10/2020 | Suzuki ................. B60W 40/06 |
| 2020/0391559 A1* | 12/2020 | Suzuki ................. B60T 8/1725 |
| 2020/0406925 A1* | 12/2020 | Du .......................... B60T 8/172 |

FOREIGN PATENT DOCUMENTS

| | | |
|---|---|---|
| JP | 2015038516 A | 2/2015 |
| JP | 2016107833 A | 6/2016 |
| JP | 2017083264 A | 5/2017 |

\* cited by examiner

ROAD SURFACE CONDITION IDENTIFICATION APPARATUS

CROSS-REFERENCE TO RELATED APPLICATIONS

The present application is a continuation application of PCT/JP2018/043170 filed on Nov. 22, 2018 which designated the U.S and claims the benefit of priority from Japanese Patent Application No. 2017-225268 filed on Nov. 23, 2017. The entire disclosures of all of the above applications are incorporated herein by reference.

TECHNICAL FIELD

The present disclosure relates to a road surface condition identification apparatus.

BACKGROUND

There is a proposed road surface condition identification method that includes detecting, by an acceleration sensor, vibration applied to a tire, and identifying a road surface condition based on a detection result of the vibration.

SUMMARY

An embodiment of the present disclosure provides a road surface condition identification apparatus comprising a vibration detector unit mounted to a tire of a vehicle to output a detection signal being an analog signal according to magnitude of vibration of the tire. The road surface condition identification apparatus performs A-D conversion of converting the detection signal of the vibration detector into a digital signal having the predetermined number of bits to provide a digital output signal and generates road surface data representing a road surface condition exhibited in a waveform of the digital output signal. Based on data on vehicle speed, the road surface condition identification apparatus sets a conversation range of the magnitude of the vibration of the tire used in the A-D conversion.

DETAILED DESCRIPTION

Figure 1:
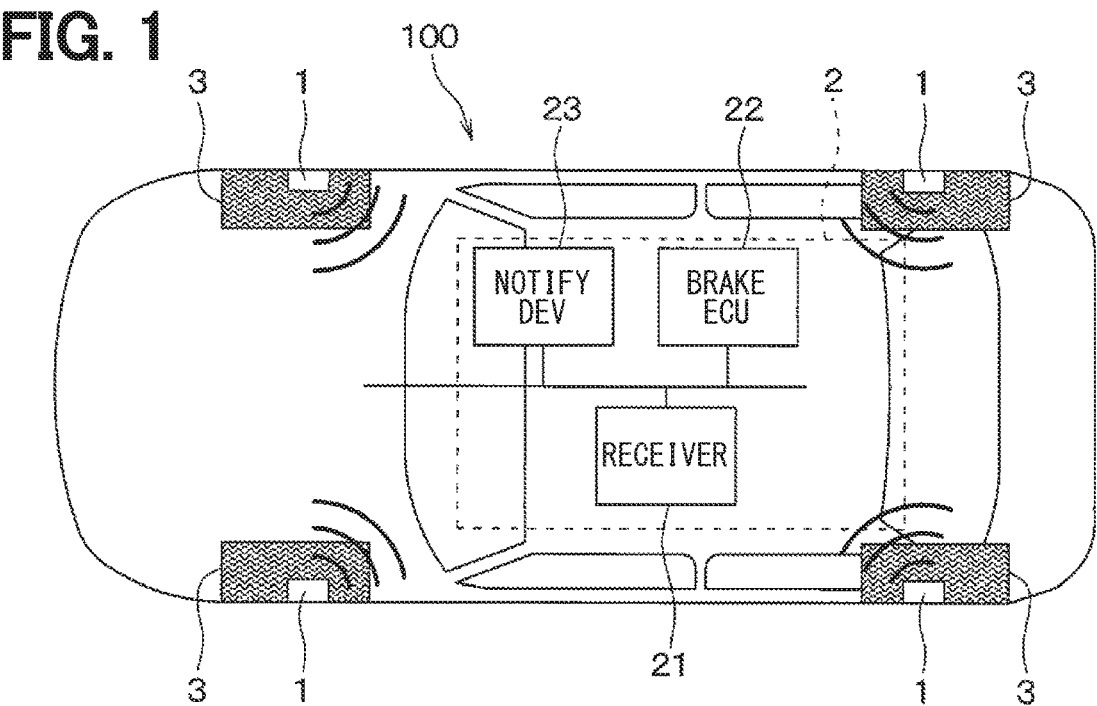
FIG. 1 is a block diagram of a tire apparatus mounted to a vehicle.

Embodiments of the present disclosure relates to a road surface condition identification apparatus that detects a vibration of a tire by a tire-associated device, generates road surface data indicating a road surface condition based on vibration data, transmits the road surface data to a vehicle body-associated system, and identifies a road surface condition based on the road surface data.

There is a proposed road surface condition identification method that uses an acceleration sensor arranged to a rear surface of a tire tread, and that includes: detecting, by the acceleration sensor, vibration applied to the tire; and identifying a road surface condition based on a detection result of the vibration. In this road surface condition identification method, a feature vector is extracted from a vibration waveform of a tire detected by the acceleration sensor, and a similarity between the extracted feature vector and a support vector is calculated for all of the support vectors stored on a road type by road type basis and the road surface condition is identified. For example, using a kernel function, the similarity between the extracted feature vector and the support vector is calculated, and the road type having the highest similarity, which may be a dry road, a wet road, a frozen road or a snowy road, is identified as the road surface condition of the currently traveling road. This kind of road surface condition identification method makes it possible to perform a highly robust road surface identification.

To perform a road surface condition identification in a way like the above, it is conceivable that a detection signal of the acceleration sensor being an analog signal is converted to a digital signal by A-D conversion, and that the extraction of the feature vector and the like are performed based on the digital signal.

This conceivable one assumes that a conversion range in the A-D conversion is fixed, and that in accordance with this conversion range, a resolution of the AD conversion, specifically, the acceleration value per LSB (hereinafter, referred to as a minimum detection G value) is also given. For example, the number of bits of a memory for use in the A-D conversion in a controller for the road surface condition identification may be given as, for example, 13 bits. In this case, when the anticipated maximum range of the input acceleration is ±350 G for example, 13 bits are used to express ±350 G and accordingly, the minimum detection G value is 0.085 G/LSB.

In this road surface condition identification, the digital signal provided by the AD conversion on the detection signal of the acceleration sensor may be subjected to frequency analysis of frequency components in each of ranges provided by dividing the detection signal of 0 kHz to 5 kHz, and the extraction of the feature vector may be performed. Accordingly, if the minimum detection G value is too large and if the input acceleration is small, a change in digital value resulting from the acceleration change may become small. The frequency analysis of frequency components in each range cannot be performed accurately and the feature vector cannot be extracted. Conversely, if the conversion range in the A-D conversion is narrowed in order to reduce the minimum detection G value, input accelerations exceeding the conversion range are all represented by the same digital value, which makes it impossible to extract the feature vector. Accordingly, there is such a difficulty that it is impossible to appropriately perform the frequency analysis and to highly accurately identify the road surface condition when the magnitude of the input acceleration changes.

In the above, explanation was given on cases where the acceleration sensor is used to detect the tire vibration. However, even when another device is used for outputting a detection signal indicating the tire vibration, if the detection signal is subjected to A-D conversion and frequency analysis, the same difficulty as described above arises.

It is an object of the present disclosure to provide a road surface condition identification apparatus that identifies a road surface condition by performing frequency analysis of a digital signal obtained by A-D-converting a detection signal representing vibration of a tire, and that can accurately identify the road surface condition even when magnitude of tire vibration changes.

In an aspect of the present disclosure, a road surface condition identification apparatus comprises a tire-associated device and a vehicle body-associated system. The tire-associated device is mounted to each of a plurality of tires of a vehicle. The tire-associated device includes: a vibration detector unit outputs a detection signal being an analog signal according to magnitude of vibration of the tire; an A-D converter unit that performs A-D conversion of converting the detection signal of the vibration detector unit into a digital signal having the predetermined number of bits to provide a digital output signal; a waveform processor unit that generates road surface data representing a road surface condition exhibited in a waveform of the digital output signal; and a first data communicator unit that sends the road surface data. The vehicle body-associated system includes: a second data communicator unit that receives the road surface data sent from the first data communicator unit; and a road surface determiner unit that identifies a road surface condition of a travel road of the vehicle based on the road surface data. The tire-associated device further includes: a vehicle speed acquirer unit that acquires data on vehicle speed being speed of the vehicle; and a range setter unit that, based on the data on the vehicle speed acquired by the vehicle speed acquirer, sets a conversion range of the magnitude of the vibration of the tire, wherein the conversion range is used by the A-D converter unit in performing the AD conversion from the detection signal into the digital signal.

In this road surface condition identification apparatus, the conversion range of the A-D converter unit used in performing the A-D conversion of the detection signal of the vibration detector unit is changed according to the vehicle speed. Therefore, it is possible to set the conversion range to adapt maximum amplitude of the detection signal of the vibration detector unit, the maximum amplitude changing according to the vehicle speed. Accordingly, even when the magnitude of the vibration of the tire changes, it is possible to accurately identify the road surface condition via performing frequency analysis of the digital output signal provided by the A-D conversion of the detection signal representing the vibration of the tire.

Embodiments of the present disclosure will be described with reference to the drawings. In description of the following embodiments, same or like reference signs are used to refer to same or like parts.

First Embodiment

A tire apparatus 100 having a road surface condition identification function according to the present embodiment will be described with reference to FIGS. 1 to 9. The tire apparatus 100 according to the present embodiment identifies a road surface condition during vehicle traveling based on vibration applied to a contact patch of a tire provided to each tire wheel of the vehicle. Based on the road surface condition, the tire apparatus 100 issues a notification of danger of the vehicle and/or performs vehicle motion control.

Figure 2:
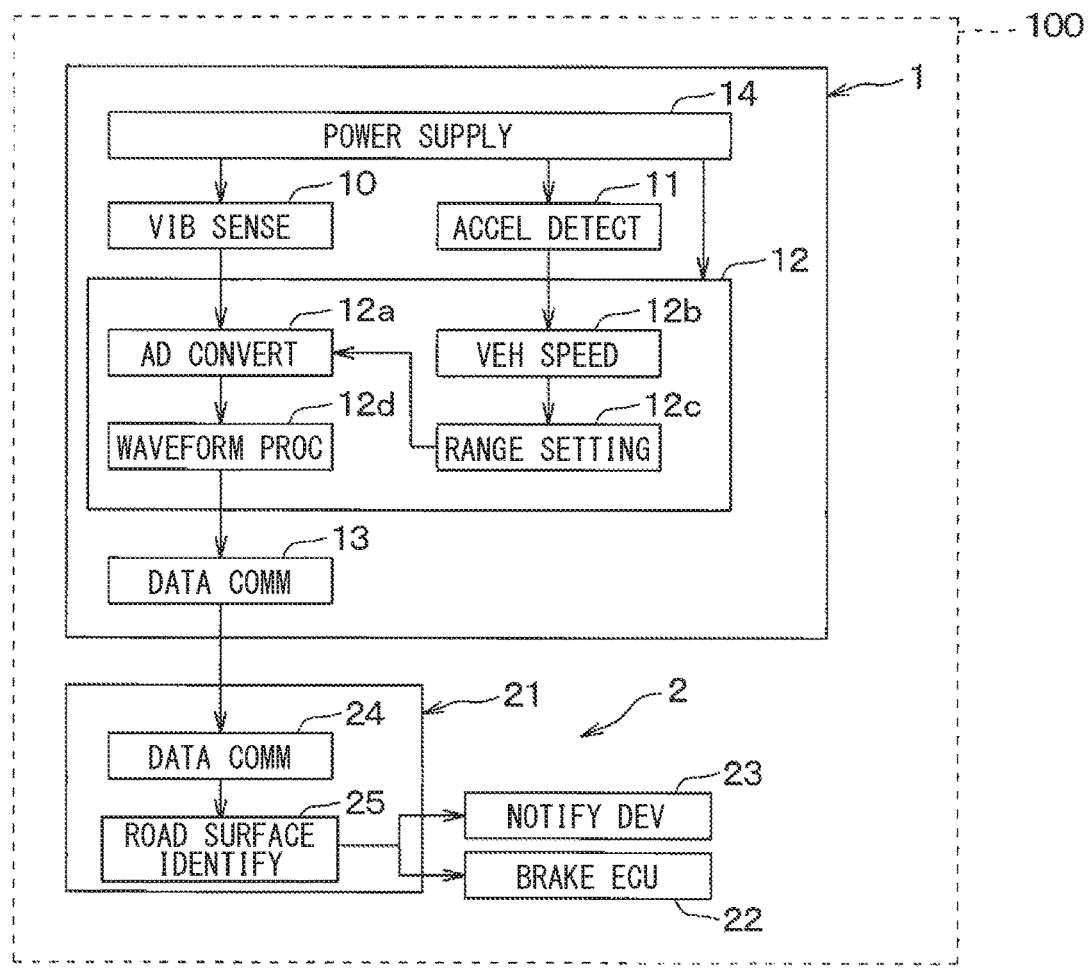
FIG. 2 is a block diagram illustrating details of a tire-associated device and a vehicle body-associated system.

As shown in FIGS. 1 and 2, the tire apparatus 100 includes a tire-associated device 1 and a vehicle body-associated system 2. The tire-associated device 1 is provided to the tire wheel. The vehicle body-associated system 2 includes various parts provided to a vehicle body. The vehicle body-associated system 2 includes a receiver 21, an electronic controller unit (ECU) for brake control (hereinafter, referred to as a brake ECU) 22, a notification device 23, and the like. Part of the tire apparatus 100 implementing the road surface condition identification function corresponds to a road surface condition identification apparatus. In the present embodiment, among the tire-associated device 1 and the vehicle body-associated system 2, the receiver 21 constitutes the road surface condition identification apparatus.

In the tire apparatus 100 according to the present embodiment, the tire-associated device 1 sends data according to a road surface condition of a road on which the vehicle with the tire 3 is traveling (hereinafter, referred to as road surface data), and the receiver 21 receive the road surface data and identifies the road surface condition. In addition, in the tire apparatus 100, a road surface condition identification result given by the receiver 21 is transmitted to the notification device 23 and the notification device 23 performs a notification of the road surface condition identification result. This makes it possible to inform the driver of a road surface condition such as a dry road, a wet road, or a frozen road, and also to warn the driver when the road is slippery for example. In addition, the tire apparatus 100 transmits the road surface condition to: the brake ECU 22 having a function of vehicle motion control; and the like so that the vehicle motion control for avoiding danger can be performed. For example, in the case of the frozen road, vehicle motion control corresponding to a low road surface μ is performed so that a braking force generated in response to a driver's brake operation amount is weakened as compared with the case of the dry road. Specifically, the tire-associated device 1 and the receiver 21 are configured as follows.

Figure 3:
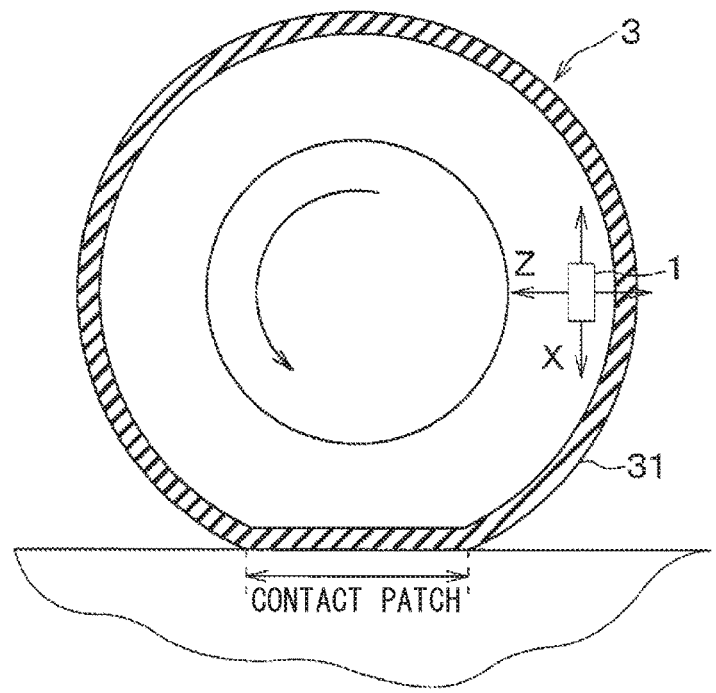
FIG. 3 is a schematic cross-sectional view of a tire to which a tire-associated device is mounted.

As shown in FIG. 2, the tire-associated device 1 includes a vibration sensor unit 10, an acceleration detector unit 11, a controller unit 12, a data communicator unit 13, and a power supply unit 14. As shown in FIG. 3, the tire-associated device 1 is arranged on a rear surface side of a tread 31 of the tire 3.

The vibration sensor unit 10 constitutes a vibration detector unit for detecting vibration applied to the tire 3. For example, the vibration sensor unit 10 includes an acceleration sensor. In cases where the vibration sensor unit 10 includes an acceleration sensor, the vibration sensor unit 10 outputs a detection signal according to magnitude of vibration in a direction of a tangent line of a circular trajectory drawn by the tire-associated device 1 when the tire 3 is rotating, specifically, in a direction of a tire tangent line indicated by the arrow X in FIG. 3. The vibration sensor unit 10 outputs this detection signal as a detection signal of acceleration. More specifically, the vibration sensor unit 10 generates an output voltage or the like as the detection signal, in which one of the two directions indicated by arrow X is positive and the other is negative. For example, the vibration sensor unit 10 performs acceleration detection in a predetermined sampling period that is set shorter than one revolution of the tire 3, and outputs the detection result as the detection signal. The detection signal of the vibration sensor unit 10 is provided as an output voltage or an output current. In the below, a case where the detection signal is provided as the output voltage will be described as an example.

The acceleration detector unit 11 detects a radial acceleration of the tire 3 to which the tire-associated device 1 is mounted. Specifically, the acceleration detector unit 11 outputs a detection signal corresponding to the radial acceleration of the tire 3 indicated by the arrow Z in FIG. 3. For example, the acceleration detector unit 11 performs acceleration detection at predetermined sampling period that is set shorter than one revolution of the tire 3, and outputs the detection result as a detection signal.

The controller unit 12 includes a microcomputer, including a CPU, a ROM, a RAM, an I/O, etc. The controller unit 12 performs signal processing on a detection signal according to a program stored in the ROM or the like, and generates a road surface data indicating a road surface condition contained in the detection signal. As functional units for performing these processes, the controller unit 12 includes an A-D converter unit 12a, a vehicle speed acquirer unit 12b, a range setter unit 12c, and a waveform processor unit 12d.

The A-D converter unit 12a plays a role of A-D converting a detection signal of the vibration sensor unit 10 being an analog signal into a digital signal, and transmitting the digital signal to the waveform processor unit 12d. The A-D converter unit 12a converts the acceleration indicated by the detection signal of the vibration sensor unit 10 into a digital value and outputs the digital value as a digital signal. This A-D conversion is performed within a set conversion range. The conversion range of the A-D conversion is variable based on a setting value transmitted from the range setter unit 12c described later. The present embodiment can set the conversion range in a stepwise manner.

The A-D converter unit 12a is configured to perform the A-D conversion in a three-level conversion range with 13 bits. The A-D converter unit 12a performs the A-D conversion on the output voltage corresponding to the detection signal of the vibration sensor unit 10 in the three-level conversion range, thereby providing the digital value. For example, in cases where the vibration sensor unit 10 includes the acceleration sensor and the detected vibration of the tire 3 is represented by acceleration, it is possible to set the conversion range of the A-D converter unit 12a to any one of three levels, ±20 G, ±100 G, and ±350.

Figure 4:
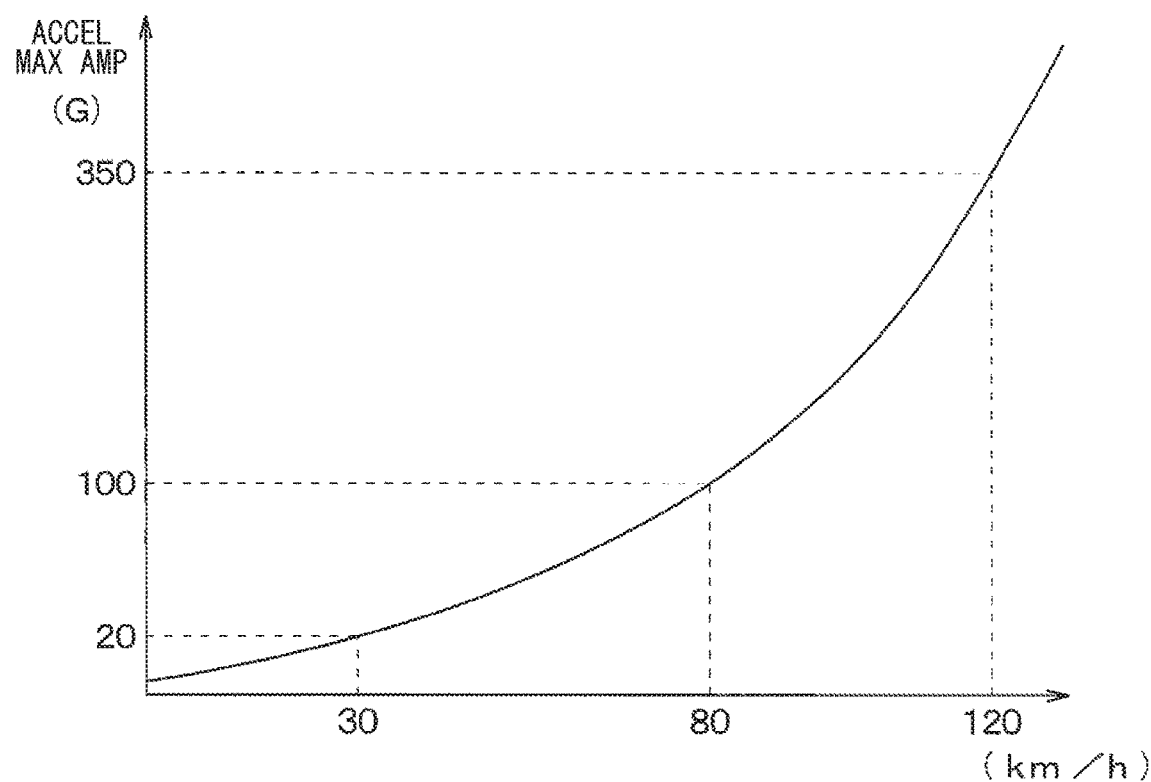
FIG. 4 is a diagram illustrating a relationship between vehicle speed and maximum acceleration amplitude.

The amplitude of the output voltage waveform serving as the detection signal of the vibration sensor unit 10 changes according to the vehicle speed, and as shown in FIG. 4, increases exponentially as the vehicle speed increases. Specifically, when the vehicle speed is in a low speed range, for example, 0 km/h to 30 km/h, the maximum amplitude of the acceleration indicated by the output voltage of the vibration sensor unit 10 is in a range of ±20 G, for example. When the vehicle speed is in a practical speed range, for example, 30 km/h to 80 km/h, the maximum amplitude of the acceleration indicated by the output voltage of the vibration sensor unit 10 is within a range of ±100 G. Further, when the vehicle speed is in a high speed range, for example, 80 km/h to 120 km/h, the maximum amplitude of the acceleration indicated by the output voltage of the vibration sensor unit 10 is within a range of ±350 G. For this reason, the A-D converter unit 12a can change the conversion range into any one of the above-described three levels that corresponds to the speed range.

For example, when 13 bits are used to express ±20 G, the minimum detection G value is 0.0049 G/LSB. When 13 bits are used to express ±100 G, the minimum detection G value is 0.024 G/LSB. When 13 bits are used to represent ±350 G, the minimum detected G value is 0.085 G/LSB. In this way, the minimum detection G value is changeable in three levels.

When the vehicle speed exceeds 120 km/h, the maximum amplitude of the output voltage of the vibration sensor unit 10 may be out of the range of ±350 G. In the present embodiment, the same conversion range is set to 120 km/h or more. Of course, when the vehicle speed is 120 km/h or more, the conversion range wider than ±350 G may be set.

The vehicle speed acquirer unit 12b plays a role of acquiring the vehicle speed, which is the speed of the vehicle. In the present embodiment, the vehicle speed acquirer unit 12b measures the radial acceleration of the tire 3 based on the detection signal of the acceleration detector unit 11, and then calculates the vehicle speed based on the acceleration. The output voltage waveform of the detection signal of the acceleration detector unit 11 includes a gravitational acceleration component and a centrifugal acceleration component. The gravitational acceleration component appears as an amplitude waveform such that one revolution of the tire 3 corresponds to one period. The centrifugal acceleration component appears as a DC component proportional to the rotation speed of the tire 3. For this reason, the vehicle speed acquirer unit 12b calculates the rotation speed of the tire 3, that is, the vehicle speed based on the number of peaks of the gravitational acceleration component, or calculates the vehicle speed based on the magnitude of the centrifugal acceleration component.

The range setter unit 12c sets a setting value, based on the vehicle speed calculated by the vehicle speed acquirer unit 12b. The setting value is used to determine the conversion range of the A-D converter unit 12a. The setting value may be set in various forms as long as the A-D converter unit 12a can recognize a relation between the setting value and the conversion range to be set. In one example, the setting value is expressed as 1, 2, 3, for example. The range setter unit 12c sets the setting value 1 when the vehicle speed is 0 to 30 km/h, sets the setting value 2 when the vehicle speed is 30 to 80 km/h, and sets the setting value 3 when the vehicle speed is 80 km/h or more. Based on the setting value 1 to 3, the A-D converter unit 12a changes the conversion range. The conversion range is set to ±20 G when the setting value is 1, to ±100 G the setting value is 2, and to ±350 G for the setting value 3.

As described above, the conversion range of the A-D conversion in the A-D converter unit 12a is variable according to the vehicle speed, and the conversion range of the A-D conversion is set wider as the vehicle speed increases. Therefore, it is possible to set the conversion range to adapt the maximum amplitude of the vehicle speed dependent output voltage of the vibration sensor unit 10.

In the waveform processor unit 12d, a signal obtained by the AD conversion on the detection signal of the vibration sensor unit 10 (also referred to as a digital output signal) is used as a detection signal representing data of the tire vibration in the tangential direction of the tire to perform waveform processing on vibration waveform represented by the digital output signal, thereby extracting a feature of the tire vibration. In the present embodiment, the waveform processor unit 12d performs signal processing on the detection signal of the acceleration of the tire 3 (herein, the acceleration of the tire is also referred to as a tire G) to extract the feature of the tire G. The waveform processor unit 12d transmits data including the extracted feature to the data communicator unit 13 as the road surface data. The details of the feature will be described later.

Data sending from the data communicator unit 13 is controlled by the waveform processor unit 12d. The waveform processor unit 12d causes the data communicator unit 13 to perform the data sending, by the waveform processor unit 12d transmitting the road surface data to the data communicator unit 13 at a timing at which the waveform processor unit 12d would like the data communicator unit 13 to perform the data sending. For example, the waveform processor unit 12d extracts the feature of the tire G each time the tire 3 makes one revolution, and transmits the road surface data to the data communicator unit 13 once or a plurality of times every time the tire 3 makes one revolution or every time the tire 3 makes a plurality of revolutions. For example, to the data communicator unit 13, the waveform processor unit 12d transmits the road surface data including the feature of the tire G extracted in the curse of one revolution of the tire 3 when the road surface data is transmitted to the data communicator unit 13.

The data communicator unit 13 corresponds to a first data communicator unit. For example, upon the road surface data being transmitted from the waveform processor unit 12d, the data communicator unit 13 sends the road surface data at that timing. The timing of the data sending from the data communicator unit 13 is controlled by the waveform processor unit 12d, and the data sending from the data communicator unit 13 is performed every time the road surface data is transmitted from the waveform processor unit 12d in response to the one revolution or the plurality of revolutions of the tire 3.

The power supply unit 14 serves as a power supply for the tire-associated device 1, and supplies power to each unit included in the tire-associated device 1 so that each unit can operate. The power supply unit 14 includes a battery such as a button battery, for example. Since the tire-associated device 1 is provided to the tire 3, the battery cannot be easily replaced, and it is necessary to reduce power consumption. In addition to or in place of the battery, the power supply unit 14 may include a power generator, a storage battery, and the like. When the power supply unit 14 includes the power generator, a battery life problem does not matter, as compared with the case where the power supply unit is a battery. Nevertheless, since it is difficult to generate large power, it is preferable to reduce power consumption.

The receiver 21, the brake ECU 22, and the notification device 23 constituting the vehicle body-associated system 2 are driven when a start switch such as an ignition switch (not shown) is turned on.

The receiver 21 includes a data communicator unit 24 and a road surface determiner unit 25, as shown in FIG. 2.

The data communicator unit 24 corresponds to a second data communicator unit, and plays a role of (i) receiving the road surface data including the feature sent from the data communicator unit 13 of the tire-associated device 1 and (ii) transmitting the road surface data to the road surface determiner unit 25.

The road surface determiner unit 25 includes a microcomputer, including a CPU, a ROM, a RAM, an I/O, and performs various processes according to a program stored in the ROM or the like to identify a road surface condition. Specifically, the road surface determiner unit 25 stores support vectors, and identifies the road surface condition by comparing the road surface data transmitted from the controller unit 12 with the support vectors.

The support vectors are stored and retained on a road surface type by road surface type basis. The support vectors are features serving as models, and are obtained by, for example, learning using support vector machine. In experiments, the vehicle equipped with the tire-associated device 1 is travelled on various types of road surface, and features extracted by the controller unit 12 are subject to learning for the predetermined number of tire revolutions. From the learned data, the predetermined number of typical features are extracted as the support vectors. For example, for each type of road surface, features for one million revolutions are learned, and, from the learned features, typical features for 100 revolutions are extracted as the support vectors.

The road surface determiner unit 25 identifies the road surface condition via comparing the feature transmitted from the tire-associated device 1 and received by the data communicator unit 24 with the stored support vectors provided on a road surface type by road surface type basis. For example, the feature included in the road surface data received this time is compared with the support vectors provided on a road surface type by road surface type basis, and the road surface corresponding to the support vector having the closest feature is identified as the currently traveling road surface.

When the road surface determiner unit 25 identifies the road surface condition, the road surface determiner unit 25 transmits the road surface condition to the notification device 23 to inform the driver of the road surface condition on an as-needed basis. This causes the driver to take care of driving according to the road surface condition, and makes it possible to avoid danger of the vehicle. For example, using the notification device 23, the identified road surface condition may be always displayed. Alternatively, only when the identified road surface condition requires careful driving such as a wet road or a frozen road, the road surface condition may be displayed to warn the driver. The road surface condition is transmitted from the receiver 21 to an ECU such as the brake ECU 22 for performing vehicle motion control, and the vehicle motion control is executed based on the transmitted road surface condition.

The brake ECU 22 corresponds to a braking control device which performs various types of brake control. Specifically, the brake ECU 22 controls the braking force by increasing or decreasing wheel cylinder pressure by driving an actuator provide to control brake fluid pressure. Further, the brake ECU 22 can also independently control the braking forces of respective tire wheels. When the road surface condition is transmitted from the receiver 21, the brake ECU 22 performs braking force control as vehicle motion control based on the road condition. For example, when the transmitted road surface condition indicates that the vehicle is on a frozen road, the brake ECU 22 weakens the braking force generated per a certain driver's brake operation amount, as compared with a dry road surface. Thereby, it is possible to suppress tire wheel slip and avoid danger of the vehicle.

The notification device 23 may include, for example, a meter display to notify the driver of a road surface condition. The mater display is arranged in a place where the driver can visually recognize while driving the vehicle, and is installed, for example, in an instrument panel of the vehicle. When the road surface condition is transmitted from the receiver 21, the meter display displays the road surface condition in a manner that allows the road surface condition to be grasped, thereby visually notifying the driver of the road surface condition.

The notification device 23 may include a buzzer, a voice guidance device, or the like. In this case, the notification device 23 can audibly notify the driver of the road surface condition by a buzzer sound or voice guidance. Further, although the meter display is described as an example of the notification device 23 that performs visual notification, the notification device 23 may further or alternatively include a head-up display or the like.

The tire apparatus 100 according to the present embodiment is configured in the above way. The units of the vehicle body side system 2 are connected to each other via an in-vehicle LAN (abbreviation of Local Area Network) by CAN (Controller Area Network) communication etc., for example. The units are communicable with each other via the in-vehicle LAN.

Next, details of the feature extracted by the above-described waveform processor unit 12d will be described.

The feature described herein is a quantity indicating a characteristic of the vibration applied to the tire 3 acquired by the vibration sensor unit 10, and is expressed as a feature vector.

Figure 5:
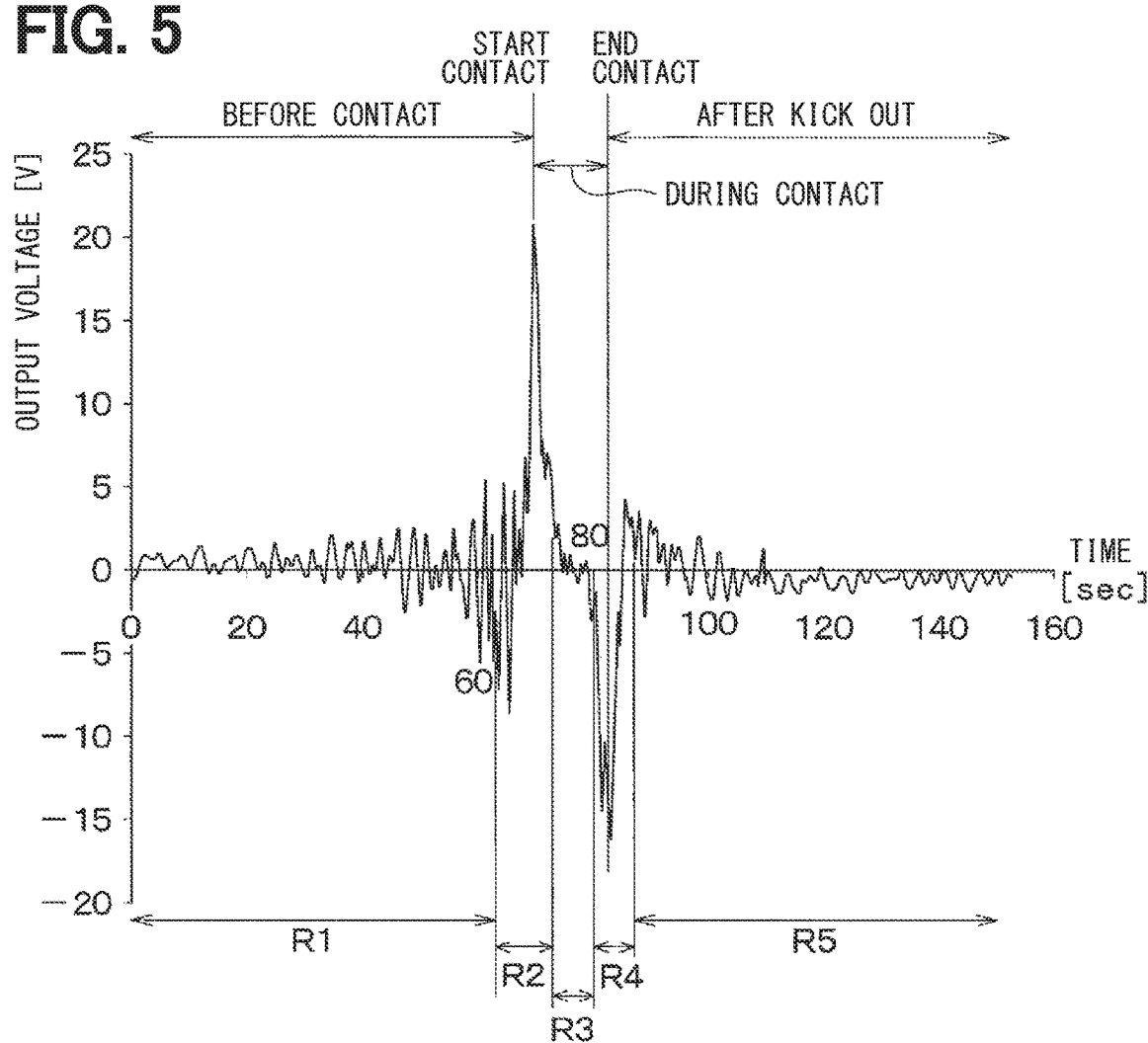
FIG. 5 is a diagram of output voltage waveform of a vibration sensor unit during tire revolution.

The output voltage waveform of the detection signal of the vibration sensor unit 10 when the tire is rotating is, for example, a waveform shown in FIG. 5. As shown in FIG. 5, the output voltage of the vibration sensor unit 10 has a maximum value at a ground contact start time. The ground contact start time is a time when a portion of the tread 31 of the rotating tire 3 corresponding to the location of the vibration sensor unit 10 starts contacting the ground. Hereinafter, a peak value at the start of contacting the ground at which the output voltage of the vibration sensor unit 10 has the maximum value is referred to as a first peak value. Further, as shown in FIG. 5, the output voltage of the vibration sensor unit 10 has a minimum value at a ground contact end time. The ground contact end time is a time when the portion of the tread 31 of the rotating tire 3 corresponding to the location of the vibration sensor unit 10 ends contacting the ground. Hereinafter, the peak value at the end of contacting the ground at which the output voltage of the vibration sensor unit 10 has the minimum value is referred to as a second peak value.

A reason why the output voltage of the vibration sensor unit 10 has the peak values at the above timings is as follows. When the portion of the tread 31 of the rotating tire 3 corresponding to the location of the vibration sensor unit 10 starts contacting the ground, a substantially cylindrical surface portion of the tire 3 in the vicinity of the vibration sensor unit 10 is pressed and deformed into a planner shape. At that time, an impact is applied to the vibration sensor unit 10 and accordingly the output voltage of the vibration sensor unit 10 has the first peak value. Further, when the ground-contact portion of the tread 31 of the rotating tire 3 corresponding to the location of the vibration sensor unit 10 separates from the ground, the planner shape portion of the tire 3 in the vicinity of the vibration sensor unit 10 is released from being pressed and returns to the substantially cylindrical shape portion. At that time, an impact due to the shape restoration of the tire 3 is applied to the vibration sensor unit 10 and accordingly the output voltage of the vibration sensor unit 10 has the second peak value. In this way, the output voltage of the vibration sensor unit 10 has the first peak value at the ground contact start time and the second peak value at the ground contact end time. Further, since the direction of the impact at the pressing of the tire 3 is pressed is opposite to the direction of the impact at the releasing of the tire 3 from the pressed state, the signs of the output voltage are also opposite.

In the present embodiment, the moment at which the portion of the tread 31 corresponding to the location of the vibration sensor unit 10 touches the road surface is referred to as a "step-in region" and the moment at which the tire separates from the road surface is referred to as a "kick-out region". The "step-in region" includes the timing of the first peak value, and the "kick-out region" includes the timing of the second peak value. In addition, a region before the step-in region is referred to as a "pre-step-in region". A region between the step-in region and the kick-out region, that is, a ground contact region of the tire tread 31 corresponding to the location of the vibration sensor unit 10 is referred to as a "pre-kick-out region". A region after the kick-out region is referred to as a "post-kick-out region". In this manner, a time period including before and within and after the portion of the tire tread 31 corresponding to the location of the vibration sensor unit 10 is in contact with the ground can be divided into five regions. In FIG. 5, the "pre-step-in region", "step-in region", "the pre-kick-out region", "kick-out region" and the "post-kick-out region" of the detection signal are shown as five areas R1 to R5 in this order.

The vibration generated in the tire 3s in each of the divided regions changes according to the road surface condition, and the detection signal of the vibration sensor unit 10 changes. Thus, frequency analysis on the detection signal of the vibration sensor unit 10 in each region is performed to detect a road surface condition of a road surface on which the vehicle is traveling. For example, in a slippery road surface such as a compacted-snow road, a shear force at the time of the kick-out decreases, and thus, in the kick-out region R4 and the post-kick-out region R5, a band value selected from the 1 kHz to 4 kHz band decreases. Since each frequency component of the detection signal of the vibration sensor unit 10 changes according to the road surface condition, it is possible to identify the road surface condition based on the frequency analysis of the detection signal.

Figure 6:
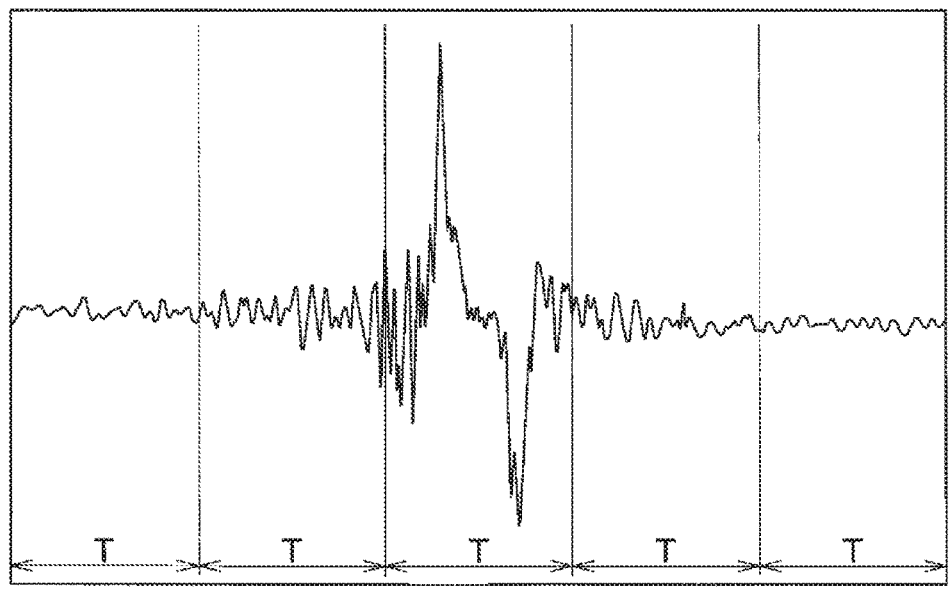
FIG. 6 is a diagram illustrating a detection signal of a vibration sensor unit divided by unit time window having a predetermined time width T.

To do so, first, the detection signal of the vibration sensor unit 10 for one revolution of the tire 3, which has a continuous waveform, is divided into a plurality of sections in unit of time window having a predetermined time width T, as shown in FIG. 6. In each of the sections, the frequency analysis is performed to extract a feature. Specifically, by performing the frequency analysis in each section, power spectrum in each frequency band, that is, vibration levels in a specific frequency band, is obtained, and this power spectrum is used as a feature.

In the above, for the sake of easy understanding, the description has been made using the raw waveform of the detection signal of the vibration sensor unit 10 represented by an analog signal as it is, but in practice, the extraction of the feature by the waveform processor unit 12d is performed based on the digital output signal given by the A-D conversion.

Here, the number of divided sections, each section having the time window of the time width T, varies according to the vehicle speed, more specifically, according to the rotation speed of the tire 3. In the following description, the number of sections for one revolution of the tire is denoted by n (where n is a natural number).

For example, the power spectrum is obtained by passing the detection signal of each section through a plurality of filters of specific frequency bands. The plurality of filters of specific frequency bands are, for example, five band-pass filters which are a band-pass filter of 0 kHz to 1 kHz, a band-pass filter of 1 kHz to 2 kHz, a band-pass filter of 2 kHz to 3 kHz, a band-pass filter of 3 kHz to 4 kHz, and a band-pass filter of 4 kHz to 5 kHz. The power spectrum is given as the feature. This feature is called a feature vector, and the feature vector Xi of a certain section i (where i is a natural number of 1=<i=<n) is expressed as a matrix whose matrix elements are power spectrum values $a_{ik}$, specifically expressed as the following Equation 1.

$$X_i = \begin{bmatrix} a_{i1} \\ a_{i2} \\ a_{i3} \\ a_{i4} \\ a_{i5} \end{bmatrix} \quad \text{(Equation 1)}$$

where k in the power spectrum value $a_{ik}$ is the number of the specific frequency band, that is, the number of the band-pass filter. When the band of 0 to 5 kHz is divided into five bands as described above, k=1 to 5 is satisfied. A matrix X which comprehensively expresses the feature vectors X1 to Xn of all the sections 1 to n is expressed as following Equation 2.

$$X = \begin{pmatrix} a_{11} & a_{21} & \ldots & a_{n1} \\ a_{12} & a_{22} & \ldots & a_{n2} \\ a_{13} & a_{23} & \ldots & a_{n3} \\ a_{14} & a_{24} & \ldots & a_{n4} \\ a_{15} & a_{25} & \ldots & a_{n5} \end{pmatrix} \quad \text{(Equation 2)}$$

This matrix X is an expression representing the feature for one revolution of the tire. The waveform processor unit 12d extracts the feature expressed as the matrix X by performing the frequency analysis of the detection signal of the vibration sensor unit 10.

Next, the road surface condition identification by the tire apparatus 100 according to the present embodiment will be described with reference to FIGS. 7 and 8.

Figure 7:
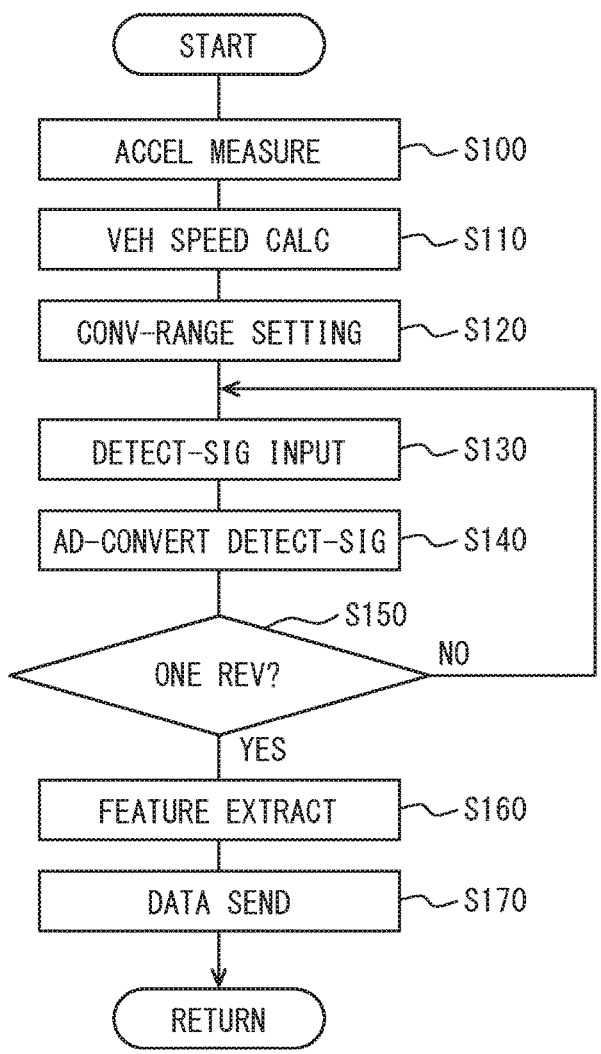
FIG. 7 is a flowchart of a data sending process performed by a tire-associated device.

In the tire-associated device 1 of each tire wheel, the controller unit 12 executes a data sending process shown in FIG. 7. This process is executed at predetermined control intervals.

First, in S100, the radial acceleration of the tire 3 is measured based on the detection signal of the acceleration detector unit 11. Thereafter, in S110, the vehicle speed is calculated based on the gravitational acceleration component or the centrifugal acceleration component included in the radial acceleration. Thereafter, the process proceeds to S120, in which the vehicle speed dependent setting value of the conversion range of A-D conversion is set. Specifically, when the vehicle speed is in the low speed range of 0 km/h to 30 km/h, the setting value 1 for the conversion range of ±20 G is set. When the vehicle speed is in the practical speed range of 30 km/h to 80 km/h, the setting value 2 for the conversion range of ±100 G is set. When the vehicle speed is in the high speed range of 80 km/h or more, the setting value 3 for the conversion range of ±350 G is set.

Thereafter, the process proceeds to S130 in which the detection signal of the vibration sensor unit 10 is input. Thereafter, the proceeds to S140 in which the A D conversion on the detection signal of the vibration sensor unit 10 is performed to obtain the digital output signal. S130 and S140 are continued until it is determined in S150 that the tire 3 has made one revolution. When the digital output signal for one revolution of the tire is input, the process proceeds to step S160. In S160, the feature of the time domain waveform of the digital output signal for one revolution of the tire is extracted.

The determination of whether the tire 3 has made one revolution is made based on the time domain waveform of the digital output signal. Specifically, since the digital output signal is obtained by A-D converting the detection signal of the vibration sensor unit 10 drawing the waveform in time domain as shown in FIG. 5, it is possible to recognize the one revolution of the tire 3 by recognizing the first peak value and/or the second peak value of the digital output signal.

The road surface condition is exhibited as a change in the time domain waveform of the digital output signal, in particular in the time period including the "step-in region", the "pre-kick-out region", the "kick-out region" and regions before and after these. Therefore, it may be sufficient to input the data of this time period, and it may not necessary to input all data of the digital output signal for one revolution of the tire. For example, it may be sufficient to input part of the data of the "pre-step-in region" in the vicinity of the "step-in region" and/or it may be sufficient to input part of the data of "post-kick-out region" in the vicinity of the "kick-up region". For this reason, among the "pre-step-in region" and the post-kick-out region, part of the digital output signal where the vibration levels are smaller than a predetermined threshold may be assumed to be the time period hardly influenced by the road surface condition and may not be input.

In S160, the extraction of the feature is performed in the above-described manner.

Then, the process proceeds to S170. In S170, in order to perform the data sending, the road surface data including the feature extracted in this control interval is transmitted to the data communicator unit 13. As a result, the road surface data including the feature is sent from the data communicator unit 13.

Figure 8:
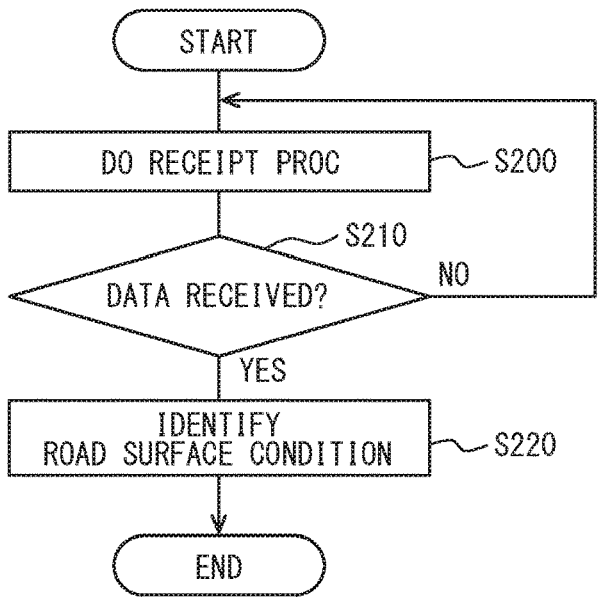
FIG. 8 is a flowchart of a road surface condition identification process performed by a vehicle body-associated system.

In the receiver 21, the road surface determiner unit 25 performs the road surface condition identification process shown in FIG. 8. This process is executed at predetermined control intervals.

First, in 200, a data receiving process is performed. The road surface determiner unit 25 performs this process by taking in the road surface data in response to the data communicator unit 24 receiving the road surface data. When the data communicator unit 24 is not performing data receiving, the road surface determiner unit 25 ends this process without taking in any road surface data.

Thereafter, the process proceeds to step S210 in which it is determined whether or not the data has been received. If the data has been received, the process proceeds to step S220. If not, S200 and S210 are repeated until the data is received.

Then, the process proceeds to step S220 in which the road surface condition is identified. The identification of the road surface condition is made by comparing the feature included in the received road surface data with the support vectors for respective types of road surface stored in the road surface determiner unit 25. For example, for all the support vectors for respective types of road surface, a similarity between the feature and a respective support vector is calculated, and the road surface corresponding to the support vector having the highest similarity is identified as the road surface that the vehicle is now traveling.

For example, the similarity between the feature and a respective support vector may be calculated for all the support vectors for respective types of road surface in the following way.

Here, the matrix expressing the feature is denoted by X(r) and the matrix of the support vector is denoted by X(s). The power spectrum values $a_{ik}$ given as the matrix elements of X(r) is denoted by $a_{ik}(r)$ and the power spectrum values $a_{ik}$ given as the matrix elements of X(s) is denoted by $a_{ik}(s)$. In these notations, the matrix X(r) of the feature and the matrix X(s) of the support vector are expressed as the following Equations 3 and 4.

$$X(r) = \begin{pmatrix} a(r)_{11} & a(r)_{21} & \ldots & a(r)_{n1} \\ a(r)_{12} & a(r)_{22} & \ldots & a(r)_{n2} \\ a(r)_{13} & a(r)_{23} & \ldots & a(r)_{n3} \\ a(r)_{14} & a(r)_{24} & \ldots & a(r)_{n4} \\ a(r)_{15} & a(r)_{25} & \ldots & a(r)_{n5} \end{pmatrix} \quad \text{(Equation 3)}$$

$$X(s) = \begin{pmatrix} a(s)_{11} & a(s)_{21} & \ldots & a(s)_{n1} \\ a(s)_{12} & a(s)_{22} & \ldots & a(s)_{n2} \\ a(s)_{13} & a(s)_{23} & \ldots & a(s)_{n3} \\ a(s)_{14} & a(s)_{24} & \ldots & a(s)_{n4} \\ a(s)_{15} & a(s)_{25} & \ldots & a(s)_{n5} \end{pmatrix} \quad \text{(Equation 4)}$$

The similarity represents a degree of how the feature and the support vector expressed as the two matrixes are similar to each other. As the similarity is higher, the feature and the support vector are more similar to each other. In the present embodiment, the road surface determiner unit 25 calculates the similarity by using the kernel method, and identifies the road surface condition based on the similarity. The road surface determiner unit 25 of the present embodiment calculates an inner product of the matrix X(r) of the feature and the matrix X(s) of the support vector. In other words, the road surface determiner unit 25 calculates, in a feature space, distances between coordinate points of the feature vectors of the divided sections each having unit time window having the predetermined time width T. The inner product is used as the similarity.

Figure 9:
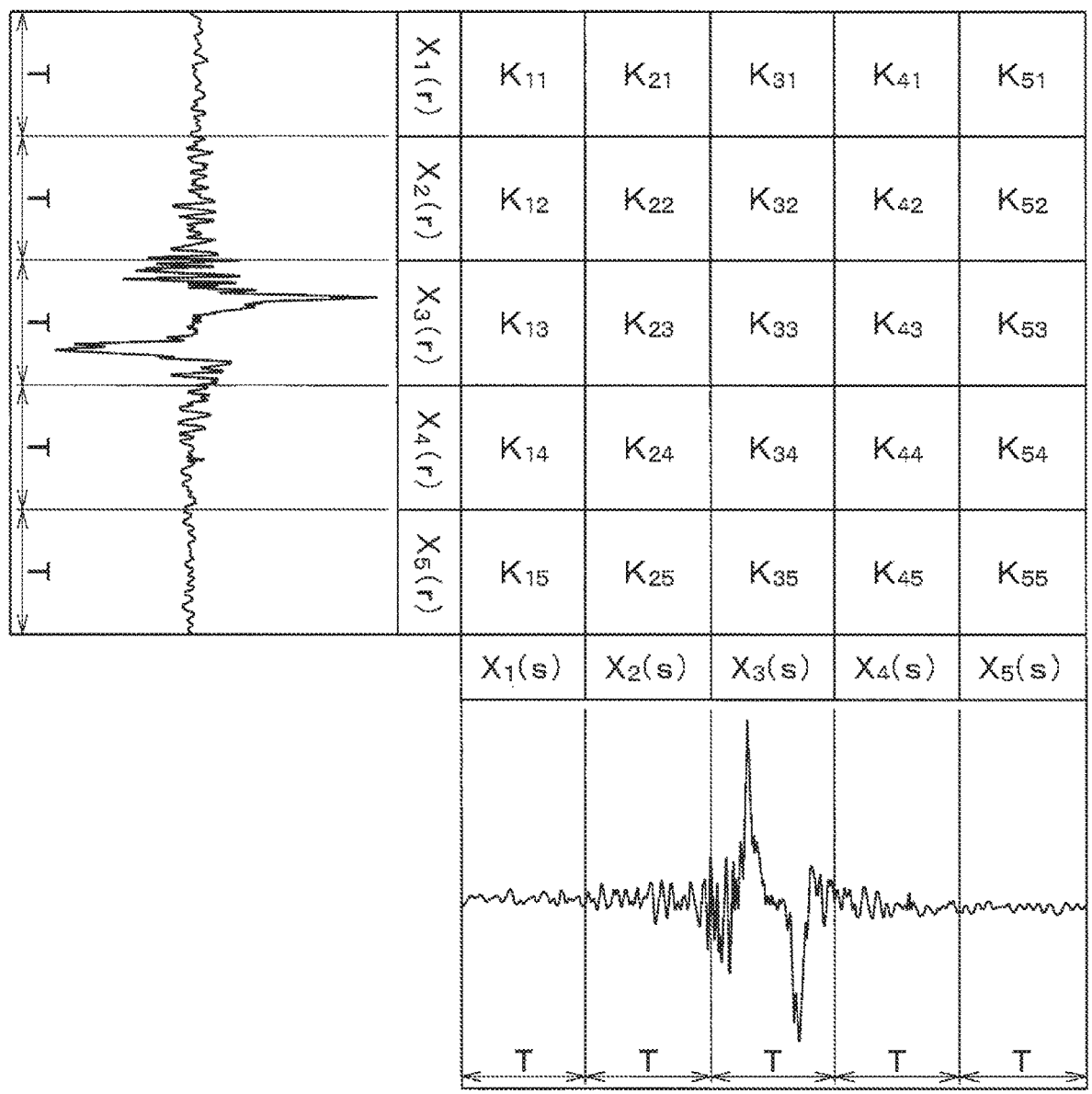
FIG. 9 is a diagram illustrating a relationship among matrixes $X_i(r)$, $X_i(s)$ and distances $K_y$.

For example, as shown in FIG. 9, regarding the detection signal of the vibration sensor unit 10, specifically, the time domain waveform of the digital output signal, the time domain waveform at the time of the revolution of the tire 3 this time and the time domain waveform for the support vector are each divided by the time window of the predetermined time width T and accordingly divided into the sections. In the example in FIG. 9, because each of the time domain waveforms are divided into the five sections, the relations n=5 and 1=<i=<5 are satisfied. Here, as shown in FIG. 9, the feature vector Xi of each section at the time of the revolution of the tire 3 this time is denoted by Xi(r), and the feature vector Xi of each section of the support vector is denoted by Xi(s). In these notations, the distances $K_{yz}$ between the coordinate points given by the feature vectors Xi of the sections are expressed in cells that are provided by intersecting horizontal cells and vertical cells, where the horizontal cells include the feature vectors Xi(r) of the respective sections at the time of the revolution of the tire 3 this time and the vertical cells include the feature vectors Xi(r) of the respective sections. In the above notation of $K_{yz}$, y corresponds to i in the Xi(r) and z corresponds to i in Xi(s). It is noted that the number of sections of the waveform at the time of the revolution of the tire 3 this time and the number of sections of the waveform for the support vector may actually differ according to the vehicle speed; however, the description is given by way of example in which these are the same.

In the present embodiment, in order to obtain the feature vector, the band is divided into the five specific frequency bands. For this reason, the feature vector Xi of each section is expressed in a six-dimensional space including the time axis, and thus the distance between the coordinate points of the feature vectors of the sections is a distance between the coordinate points in the six-dimensional space. In this regard, the distance between the coordinate points of the feature vectors of a respective section is smaller as the feature and the support vector are more similar to each other, and this distance is larger as the feature and the support vector are less similar to each other. Therefore, the smaller this distance is, the higher the similarity is indicated. The larger this distance is, the lower the similarity is indicated.

For example, in cases where the time division results in the sections 1 to n, the distance $K_{yz}$ between coordinate points indicated by the feature vectors of the section 1 is expressed by the following equation.

$$Kyz = \frac{}{\sqrt{\{a(r)_{11} - a(s)_{11}\}^2 + \{a(r)_{12} - a(s)_{12}\}^2 + \ldots \{a(r)_{15} - a(s)_{15}\}^2}} \quad \text{(Equation 5)}$$

In this way, the distance $K_{yz}$ between coordinate points indicated by a feature vector of a section and coordinates indicated by a feature vector of a section is obtained for all of the sections given by the time division, and the total sum of the distances $K_{yz}$ for the all of the sections is calculated as $K_{total}$. This total sum $K_{total}$ is uses as a value corresponding to the similarity. Then, the total sum $K_{total}$ is compared with a predetermined threshold Th. When the total sum $K_{total}$ is larger than the threshold Th, the similarity is determined to be low. When the total sum $K_{total}$ is smaller than the threshold Th, the similarity is determined to be high. This calculation of the similarity is performed for all the support vectors, and the type of the road surface corresponding to the support vector with the highest similarity is identified as the current road surface condition. In this way, the road surface condition may be identified.

In the above, the total sum $K_{total}$ of the distances $K_{yz}$ between the two coordinate points indicated by the feature vectors of the sections is used as the value corresponding to the similarity. However, a parameter representing the similarity other than the above is usable. For example, the parameter indicating the similarity may be an average distance $K_{ave}$, which is an average value of the distances $K_{yz}$ obtained by dividing the total sum $K_{total}$ by the number of sections. Also, the similarity may be obtained using various kernel functions as described in US2018/264894A (JP 2016-107833A). Also, the calculation of the similarity may be done by excluding a path having a low similarity.

As described above, the tire apparatus 100 according to the present embodiment identifies the road surface condition of the road surface where the vehicle is traveling. For identifying the road surface condition, the detection signal of the vibration sensor unit 10 is subject to the A-D conversion by the A-D converter unit 12a in a manner that enables the conversion range to be changed according to the vehicle speed. Therefore, it is possible to set the conversion range to adapt the maximum amplitude of the output voltage of the vibration sensor unit 10 wherein the maximum amplitude changes according to the vehicle speed. Therefore, it is possible to identify the road surface condition with high accuracy even when the magnitude of the vibration of the tire 3 changes in performing the A-D conversion of the detection signal representing the vibration of the tire 3 to perform the frequency analysis of the digital output signal for the road surface condition identification.

Second Embodiment

A second embodiment will be described. A difference of the second embodiment from the first embodiment includes a manner of acquiring the vehicle speed. In other points, the second embodiment is the same as the first embodiment. In the below, the difference from the first embodiment will be described.

The present embodiment acquires the vehicle speed by transmitting data corresponding to the vehicle speed from the vehicle body-associated system 2 to the tire-associated device 1, without arranging the acceleration detector unit 11 in the tire-associated device 1 to acquire the vehicle speed.

Figure 10:
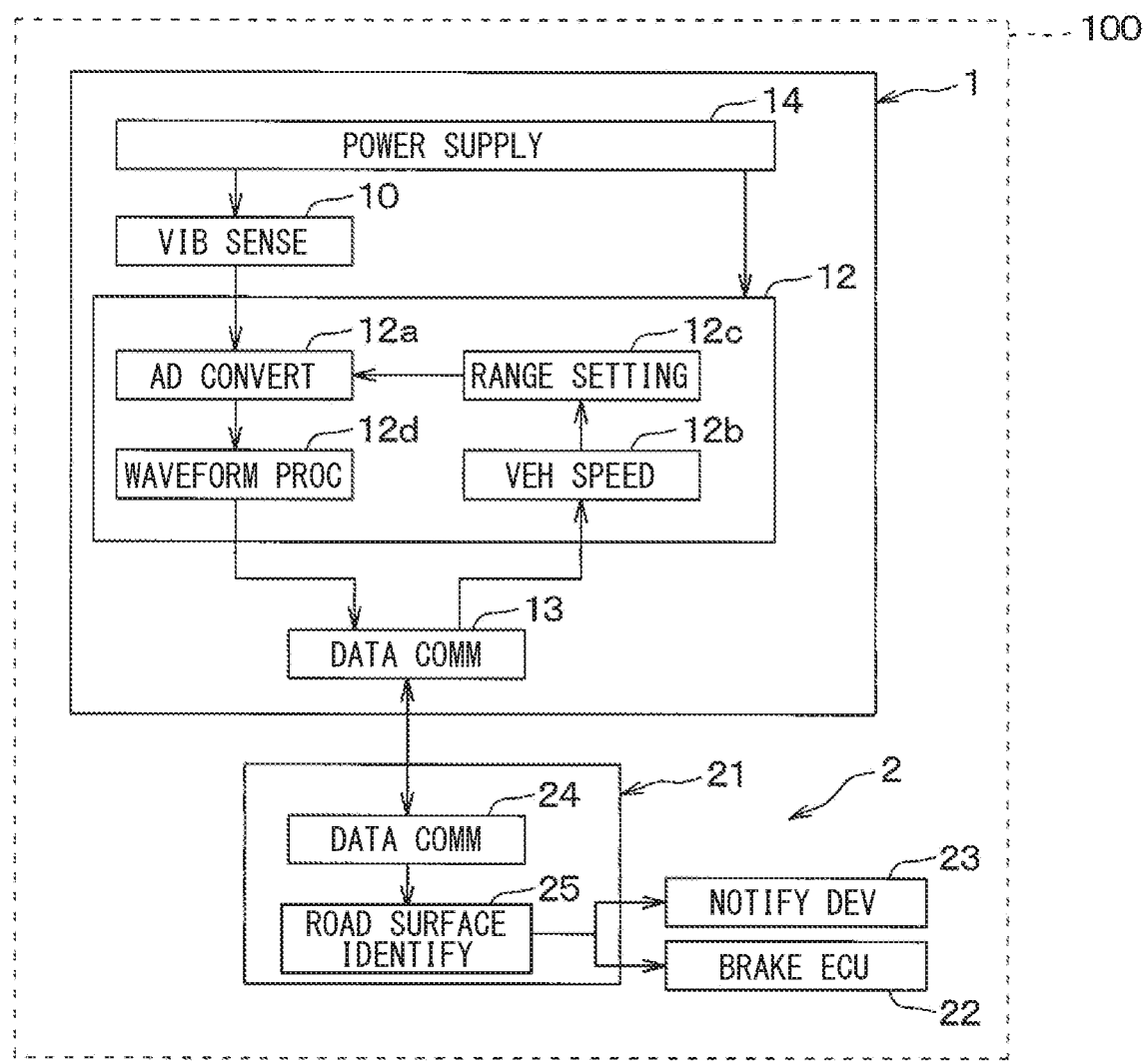
FIG. 10 is a block diagram illustrating details of a tire-associated device and a vehicle body-associated system according to a second embodiment.

As shown in FIG. 10, in the present embodiment, the tire-associated device 1 does not include the acceleration detector unit 11. Two-way communications are performable between the tire-associated device 1 and the vehicle body-associated system 2 via the data communicator unit 13 and the data communicator unit 24. In FIG. 10, each of the data communicator unit 13 and the data communicator unit 24 is shown as a single configuration but may have a transmitter device and a receiver device separately from each other. The two-way communications are implantable in various forms such as Bluetooth communications including BLE (Bluetooth Low Energy) communications, wireless LAN (Local Area Network) such as wifi, and Sub-GHz communications, ultra wideband communications, ZigBee, etc. Bluetooth is a registered trademark.

In this manner, the two-way communications are performable between the tire-associated device 1 and the acceleration detector unit 11 and the data corresponding to the vehicle speed is transmitted from the vehicle body-associated system 2 to the tire-associated device 1. The data corresponding to the vehicle speedy means data representing the vehicle speed itself or data indicating a value corresponding to the vehicle speed. Since the vehicle speed is handled by, for example, the brake ECU 22 or the like, the receiver 21 can acquire the data corresponding to the vehicle speed via the in-vehicle LAN and transmit the data to the tire-associated device 1 via the data communicator unit 24. Of course, not only the brake ECU 22 but also various devices provided in the vehicle that handle the data corresponding to the vehicle speed, and the data corresponding to the vehicle speed may be transmitted to the receiver 21 from, for example, the meter ECU.

As described above, even when the tire-associated device 1 and the vehicle body-associated system 2 are configured to perform the two-way communications with each other and the data corresponding to the vehicle speed is transmitted from the vehicle body-associated system 2 to the tire-associated device 1, it is possible to provide the technical effects as those of the first embodiment.

Third Embodiment

A third embodiment will be described. A difference of the third embodiment from the first and second embodiments includes a manner of setting the A-D conversion. In other points, the third embodiment is the same as the first and second embodiments. In the below, the difference from the first and second embodiments will be described. In the below, description will be given on an example where a configuration of the present embodiment is added to the configuration of the first embodiment; however, it is possible to add the configuration of the present embodiment to the configuration of the second embodiment.

In the first and second embodiments, the conversion range of the A-D conversion in the A-D converter unit 12a is set according to the vehicle speed. In the present embodiment, in addition to this, the conversion range is corrected according to the temperature of the vibration sensor unit 10.

Figure 11:
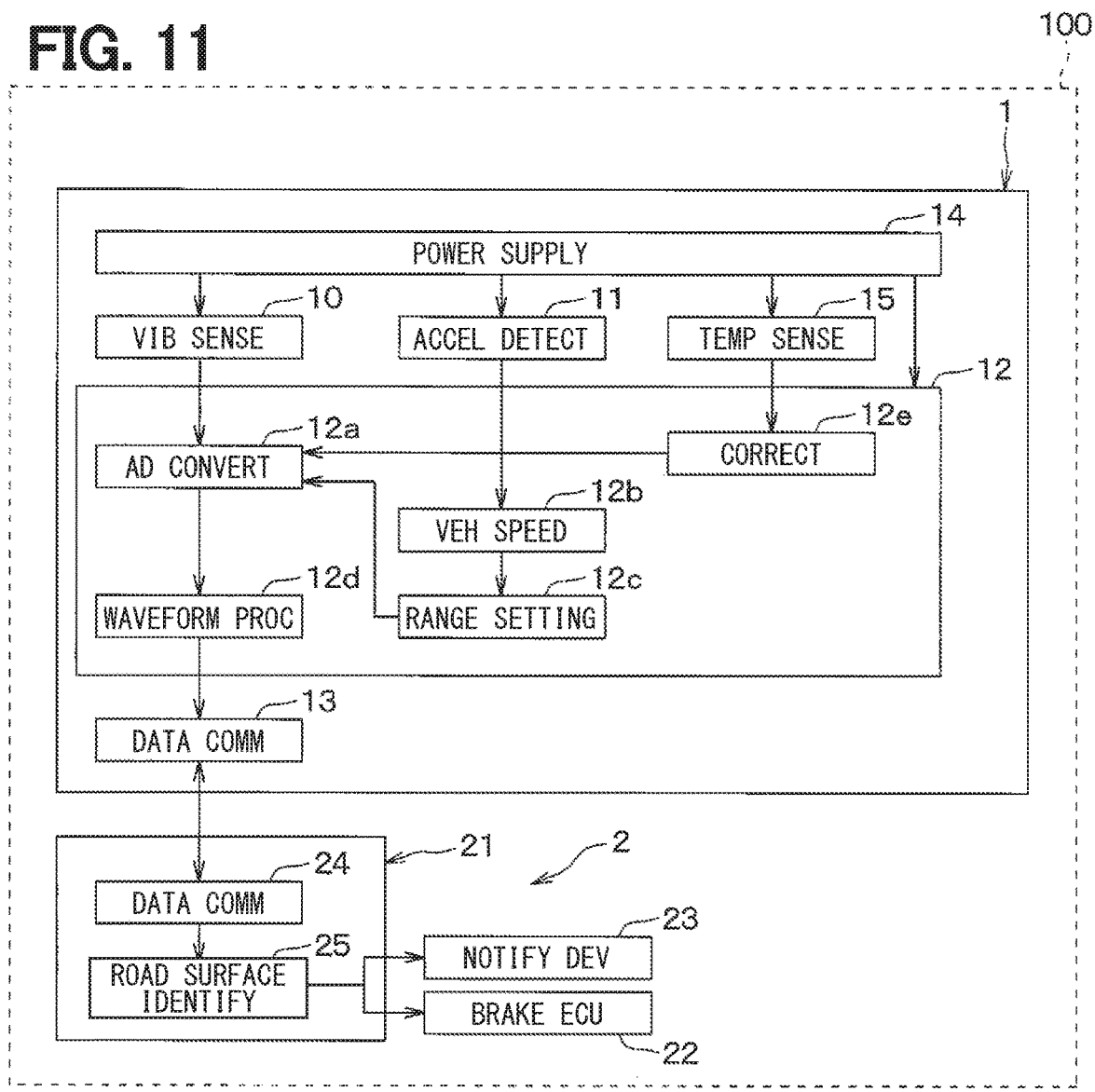
FIG. 11 is a block diagram illustrating details of a tire-associated device and a vehicle body-associated system according to a third embodiment.

As shown in FIG. 11, in the present embodiment, the tire-associated device 1 includes a temperature sensor 15 and the controller unit 12 includes a temperature-based corrector unit 12e.

The temperature sensor 15 is arranged to detect the temperature of the tire-associated device 1, specifically, the temperature of the vibration sensor unit 10, and outputs a detection signal corresponding to the temperature of the vibration sensor unit 10. The temperature-based corrector unit 12e receives the detection signal of the temperature sensor 15, measures the temperature, and corrects the conversion range of the A-D converter unit 12a based on the measured temperature. For example, the temperature-based corrector unit 12e calculates a correction coefficient according to the measured temperature. The correction coefficient is transmitted to the A-D converter unit 12a. The conversion range before the correction is multiplied by the correction coefficient in the A-D converter unit 12a; thereby, the conversion range is corrected.

As described above, since the maximum amplitude of the output voltage of the vibration sensor unit 10 varies according to the vehicle speed, it is preferable to set the conversion range of the A-D conversion accordingly. In this regard however, even at the same vehicle speed, the vibration sensor unit 10 has a temperature dependent characteristic, and the output voltage changes according to the temperature of the vibration sensor unit 10. Specifically, sensitivity of the vibration sensor unit 10 changes according to temperature.

Figure 12:
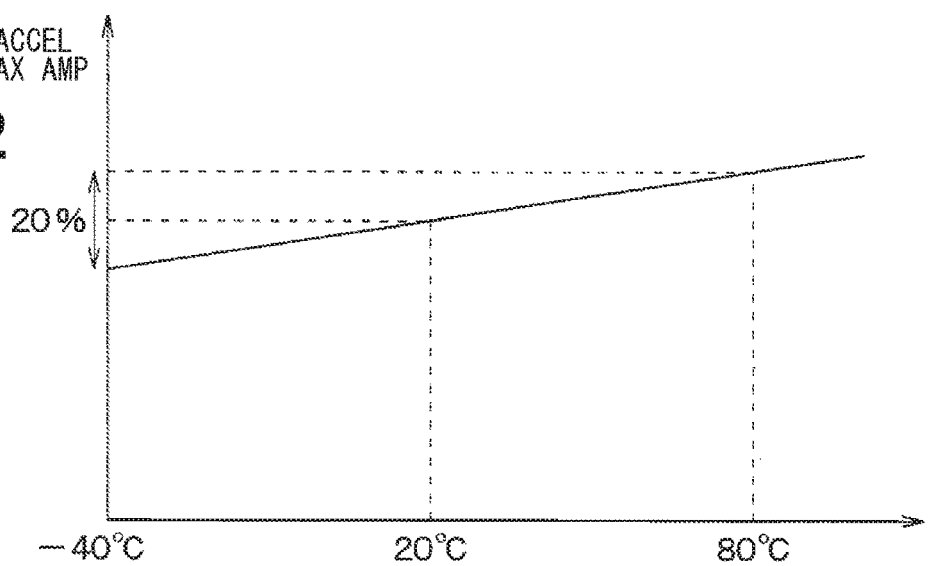
FIG. 12 is a diagram illustrating a relationship between environmental temperature assumed for use of a vehicle and a maximum acceleration amplitude.

For example, FIG. 12 shows results of studies on the temperature dependency of the output voltage of the vibration sensor unit 10 when the vehicle is traveling at the same speed on the road having the same road surface condition. In cases where the vibration sensor unit 10 includes the acceleration sensor and the detected vibration of the tire 3 is represented by the acceleration, the output voltage of the vibration sensor unit 10 changes as illustrated in FIG. 12 in a temperature range of −40 degrees Celsius to 80 degrees Celsius, wherein this temperature range is supposed to be environmental temperatures in use of the vehicle. For example, assuming that the median of the temperature range of −40 degrees Celsius to 80 degrees Celsius is a reference temperature of 20 degrees Celsius, the acceleration at −40 degrees Celsius is smaller than that at the reference temperature by 10% of the acceleration at the reference temperature. The acceleration at 80 degrees Celsius is larger than that at the reference temperature by 10% of the acceleration at the reference temperature. Specifically, the acceleration at −40 degrees Celsius and the acceleration at 80 degrees Celsius differ from each other by 20% of the acceleration at the reference temperature.

In this manner, the maximum amplitude of the output voltage of the vibration sensor unit 10 increases with increasing temperature, and thus, the correction coefficient is set so that the conversion range of the A-D conversion also increases as the temperature increases. Specifically, the correction coefficient matching the relationship illustrated in FIG. 12 is set so that the correction coefficient at −40 degrees Celsius is 0.9 and the correction coefficient at 80 degrees Celsius becomes 1.1 assuming that the correction coefficient at the reference temperature is 1.

Figure 13:
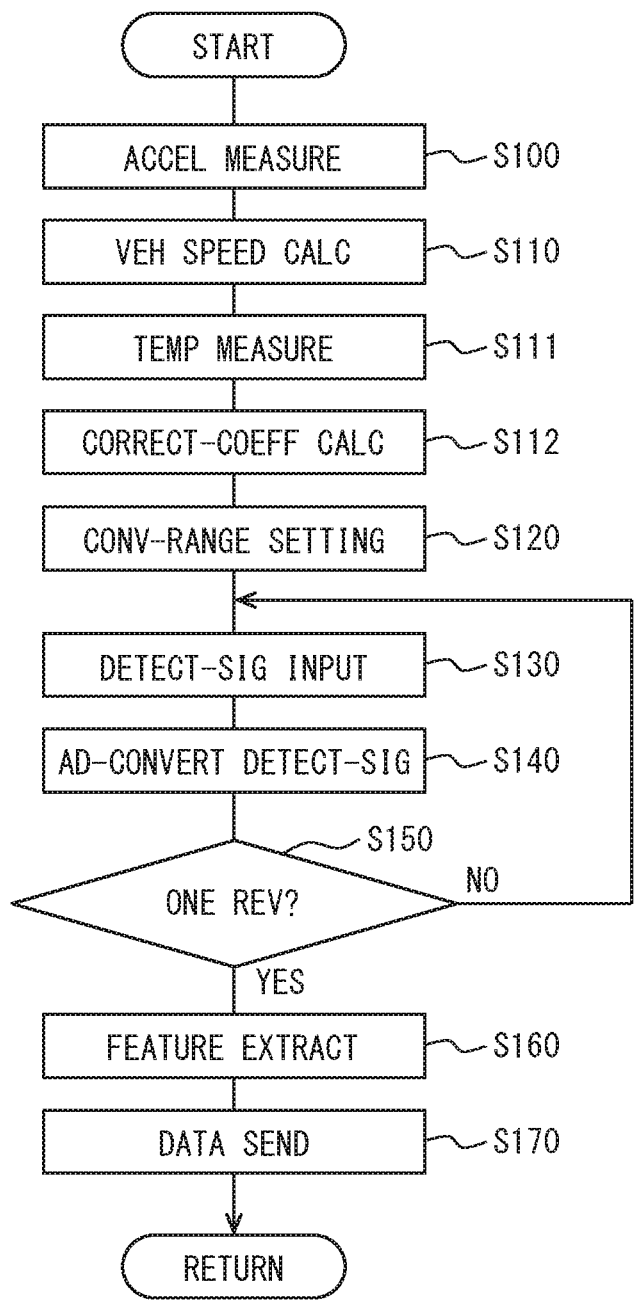
FIG. 13 is a flowchart of a data sending process performed by a tire-associated device.

The above tire-associated device 1 is configured to perform a road surface condition identification process illustrated in FIG. 13. Specifically, S100 and S110 are performed in the same ways as in FIG. 7, and thereafter, S111 and S112 are performed. In S111, the temperature of the vibration sensor unit 10 is measured based on the detection signal of the temperature sensor 15. In S112, the correction coefficient is calculated based on the measured temperature. Then, in S120, the conversion range of the A-D conversion is set according to the vehicle speed, and in this setting, the conversion range is multiplied by the correction coefficient, and the resultant conversion range is set as the corrected conversion range. Thereafter, in S130 and subsequent steps, the same processes as in FIG. 7 are performed.

This enables the conversion range of the A-D converter unit 12a to be changed according to temperature and the road surface condition to be identified highly accurately even when the output voltage of the vibration sensor unit 10 fluctuates with temperature.

Other Embodiments

Although the present disclosure has been described based on the above-described embodiments, the present disclosure is not limited to the embodiments, and covers various modification examples and modifications within an equivalent range. In addition, various combinations and forms, and other combinations and forms including only a single element, more or less elements, are also included in the scope and spirit of the present disclosure.

(1) For example, the above-described embodiments illustrate the vibration sensor unit 10 including the acceleration sensor. However, this is merely an example. The vibration sensor unit 10 may include another element for performing vibration detection such as a piezoelectric element and the like, which may perform the vibration detection by using a physical quantity other than acceleration to represent the vibration. In this case, according to the maximum amplitude of the physical quantity, the conversion range of the A-D conversion in the A-D converter unit 12a may be set. Specifically, in cases where the maximum amplitude of the output voltage or the output current, the output voltage or current serving as the detection signal of the vibration sensor unit 10, increases with increasing vehicle speed, the conversion range of the A-D conversion is wider as the vehicle speed is larger.

(2) In each of the above embodiments, the conversion range of the A-D conversion is changed in a stepwise manner, for example, in a three-step manner. However, this is merely an example. The conversion range may be changed in a two-step manner or a three-or-more step manner. The conversion range may be exponentially increases with increasing vehicle speed, in a manner like the relationship shown in FIG. 4.

(3) In the above embodiments, the data including the feature is used as the road surface data indicating the road surface condition exhibited in the detection signal of the vibration sensor unit 10. However, this is merely an example. Other data may be used as the road surface data. For example, the road surface data may be data of integral values of respective portion of the vibration waveform included in the vibration data for the one revolution of the time 3, wherein the respective portions may be the file regions R1 to R5. The road surface data may be raw waveform data representing the detection signal as it is.

(4) In each of the above embodiments, the road surface determiner unit 25 of the receiver 21 provided in the vehicle body-associated system 2 obtains the similarity between the feature and the support vector and identifies the road surface condition.

However, this is merely an example. Another part of the vehicle body-associated system 2, e.g., another ECU such as the brake ECU, may obtain the similarity between the feature and the support vector and/or may identify the road surface condition. Also, the support vectors may be stored in the tire-associated device 1 so that the tire-associated device 1 can identity the road surface condition, and the data indicative of a road surface condition identification result serving as road surface data may be sent to the vehicle body-associated system 2.

(4) The tire-associated device 1 may include an air pressure detector unit provided by a pressure sensor and/or a temperature sensor. In this case, data relating to tire air pressure may be sent to the vehicle body-associated system 2 along with the road surface data or separately from the road surface data. The data relating to the tire air pressure may be data of the air pressure and the temperature, or may be data obtained via converting the air pressure into reference temperature in a predetermined manner.

In the third embodiment, the temperature of the tire-associated device 1 is detected by the temperature sensor 15. Alternatively, the temperature may be detected by the temperature sensor included in the air pressure detector unit.

(5) Although the acceleration detector unit 11 is provided to enable the vehicle speed to obtained, the vehicle speed may be obtained based on the detection signal of the vibration sensor unit 10. Specifically, since the detection signal of the vibration sensor unit 10 has a waveform as shown in FIG. 5, the time interval between the first peak values or between the second peak values of the output voltage is the time taken for the tire 3 to make one revolution. On this basis, it is possible to calculate the vehicle speed based on the outer perimeter length of the tire 3 and the time taken to make the one revolution.

In the above case, since it is sufficient that the first peak value or the second peak value is recognized, it is possible to calculate the vehicle speed based on the raw waveform of the detection signal of the vibration sensor unit 10 before waveform shaping. Since the vehicle speed changes gradually, the vehicle speed is determined based on the vibration data after A-D conversion by the A-D converter unit 12a or based on the vibration data after waveform processing by the waveform processor unit 12d.

(5) The illustration was given in which the data corresponding to the vehicle speed transmitted from the vehicle body-associated system 2 to the tire-associated device 1 is data indicating the vehicle speed itself, as is the case of the second embodiment. However, this is merely an example. For example, the data corresponding to the vehicle transmitted from the vehicle body-associated system 2 to the tire-associated device 1 may be data indicative of the conversion range of the A-D conversion corresponding to the vehicle speed, for example, data of the setting value.

(6) In the third embodiment, the temperature sensor 15 is separate from the controller unit 12. However, the temperature sensor 15 may be built in an IC of a microcomputer constituting the controller unit 12.

What is claimed is:

1. A road surface condition identification apparatus comprising:

a tire-associated device mounted to each of a plurality of tires of a vehicle, the tire-associated device including:
  a vibration detector unit that outputs a detection signal being an analog signal according to magnitude of vibration of the tire;
  an analog-to-digital (A-D) converter unit that performs A-D conversion of converting the detection signal of the vibration detector into a digital signal having the predetermined number of bits to provide a digital output signal;
  a waveform processor unit that generates road surface data representing a road surface condition exhibited in a waveform of the digital output signal; and
  a first data communicator unit that sends the road surface data;
a vehicle body-associated system including:
  a second data communicator unit that receives the road surface data sent from the first data communicator unit; and
  a road surface determiner unit that identifies a road surface condition of a travel road of the vehicle based on the road surface data,
wherein the tire-associated device further includes:
  a vehicle speed acquirer unit that acquires data on vehicle speed being speed of the vehicle; and
  a range setter unit that, based on the data on the vehicle speed acquired by the vehicle speed acquirer unit, sets a conversion range of the magnitude of the vibration of the tire used by the A-D converter unit in performing the A-D conversion from the detection signal into the digital signal.

2. The road surface condition identification apparatus according to claim 1, wherein
the range setter unit sets the conversion range such that as the vehicle speed is larger, the conversion range is wider.

3. The road surface condition identification apparatus according to claim 1, wherein
the range setter unit sets the conversion range such that as the vehicle speed is larger, the conversion range is larger in a stepwise manner.

4. The road surface condition identification apparatus according to claim 1, wherein:
the tire-associated device includes an acceleration sensor that outputs a detection signal according to radial direction acceleration of the tire; and
the vehicle speed acquirer calculates the vehicle speed based on the detection signal of the acceleration sensor.

5. The road surface condition identification apparatus according to claim 1, wherein:
the tire-associated device and the vehicle body-associated system are communicable with each other by two-way communications; and
the vehicle speed acquirer unit acquires the data on the vehicle speed via communication from the vehicle body-associated system.

6. The road surface condition identification apparatus according to claim 1, wherein:
the tire-associated device includes a temperature sensor that outputs a detection signal according to temperature of the vibration detector unit; and
based on temperature measured using the detection signal of the temperature sensor, the conversion range which is set based on the vehicle speed is corrected by the range setter unit.

7. The road surface condition identification apparatus according to claim 6, wherein:
the tire-associated device further includes a temperature-based corrector;
based on the temperature measured using the detection signal of the temperature sensor, the temperature-based corrector calculates a correction coefficient such that as the temperature is higher, the correction coefficient is larger;
by multiplying the correction coefficient by the conversion range which is set based on the vehicle speed, the range setter unit sets the conversion range corrected.

8. A road surface condition identification apparatus comprising:
a vibration sensor mounted to a tire of the vehicle and configured to output a detection signal being an analog signal according to magnitude of vibration of the tire;
a first computer mounted to the tire of the vehicle, configured to perform analog-to-digital (A-D) conversion of converting the detection signal of the vibration sensor into a digital signal having the predetermined number of bits to provide a digital output signal, and configured to generate road surface data representing a road surface condition exhibited in a waveform of the digital output signal;
a first communicator mounted to the tire of the vehicle and configured to send the road surface data;
a second communicator mounted to other than the tire of the vehicle and configured to receive the road surface data sent from the first communicator; and
a second computer mounted to other than the tire of the vehicle and configured to identify a road surface condition of a travel road of the vehicle based on the road surface data,
wherein the first computer, which is mounted to the tire of the vehicle, is further configured to:
  acquire data on vehicle speed being speed of the vehicle; and
  based on the data on the acquired vehicle speed, sets a conversion range of the magnitude of the vibration of the tire used in the A-D conversion from the detection signal of the vibration sensor into the digital signal.

* * * * *